US009201681B2

(12) United States Patent
Bert et al.

(10) Patent No.: US 9,201,681 B2
(45) Date of Patent: Dec. 1, 2015

(54) METHOD AND CONTROLLER DEVICE FOR QUALITY OF SERVICE (QOS) CACHING IN A VIRTUALIZED ENVIRONMENT

(71) Applicant: LSI Corporation, San Jose, CA (US)

(72) Inventors: Luca Bert, Cumming, GA (US); Parag R. Maharana, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 332 days.

(21) Appl. No.: 13/767,507

(22) Filed: Feb. 14, 2013

(65) Prior Publication Data

US 2014/0229941 A1 Aug. 14, 2014

Related U.S. Application Data

(60) Provisional application No. 61/764,227, filed on Feb. 13, 2013.

(51) Int. Cl.
*G06F 9/455* (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,421,533 B2 * | 9/2008 | Zimmer et al. | 711/6 |
| 7,707,578 B1 * | 4/2010 | Zedlewski et al. | 718/102 |
| 2009/0307686 A1 * | 12/2009 | Hepkin | 718/1 |
| 2010/0281482 A1 * | 11/2010 | Pike et al. | 718/102 |
| 2011/0107031 A1 | 5/2011 | Anand et al. | |
| 2012/0017029 A1 | 1/2012 | Santos et al. | |

* cited by examiner

*Primary Examiner* — Emerson Puente
*Assistant Examiner* — Jonathan R Labud
(74) *Attorney, Agent, or Firm* — Daniel J. Santos; Smith Risley Tempel Santos LLC

(57) ABSTRACT

A method and controller device for sharing computing resources in a virtualized environment having a plurality of virtual machines. The method includes assigning a portion of the computing resources to the plurality of virtual machines. The method also includes leasing by a first virtual machine at least a portion of the assigned computing resources of at least one second virtual machine. The first virtual machine leases computing resources from the at least one second virtual machine when the first virtual machine needs additional computing resources and at least a portion of the assigned computing resources of the at least one second virtual machine are not being used by the at least one second virtual machine.

17 Claims, 5 Drawing Sheets

METHOD AND CONTROLLER DEVICE FOR QUALITY OF SERVICE (QOS) CACHING IN A VIRTUALIZED ENVIRONMENT

STATEMENT REGARDING RELATED APPLICATIONS

This patent application claims priority under 35 U.S.C. §119(e) to U.S. Provisional Patent Application Ser. No. 61/764,227, filed on Feb. 13, 2013, entitled, "Method and Controller Device for Quality of Service (Qos) Caching in a Virtualized Environment," the entire contents which are hereby incorporated by reference.

BACKGROUND OF THE INVENTION

1. Field of the Invention

The invention relates to the use of computing resources in virtualized environments. More particularly, the invention relates to the caching of computing resources among virtual machines in a virtualized environment.

2. Description of the Related Art

Quality of Service (QoS) is becoming more and more important in virtualized environments where there are multiple virtual machines (VMs) competing for a finite amount of computing resources. When caching or tiering is implemented in a virtualized environment, QoS plays an even more crucial role. Caching is a process whereby information, such as processing instructions and data, is stored in temporary locations that are more readily and quickly accessible by the processor or controller (or virtual controller in virtualized environments). Tiering involves storing data in different types of data storage locations and device depending on the type of data being stored. Both caching and tiering allow processing to be more efficient, thus improving computing speeds.

In virtualized environments, cache resources, tiering resources and single route input/output virtualization (SR-IOV) resources are limited, and therefore should be used in an efficient manner to satisfy the IO requirements of all VMs in the virtualized environment. In conventional virtualized environments, there is little if any regard for QoS as it relates to caching or tiering processes. In conventional virtualized environments, when multiple VMs are cached or tiered, all VMs have equal priority and thus all VMs go through the same cache or tiering process to access information. Such arrangement often is inefficient because each VM has its own purpose. For example, some VMs, such as exchange VMs, require a relatively accelerated input/output (IO) throughput, while other VMs do not require a relatively high IO throughput.

SUMMARY OF THE INVENTION

The invention is embodied in a method and controller device for sharing computing resources in a virtualized environment having a plurality of virtual machines. The method includes assigning a portion of the computing resources to the plurality of virtual machines. The method also includes leasing by a first virtual machine at least a portion of the assigned computing resources of at least one second virtual machine. The first virtual machine leases computing resources from the at least one second virtual machine when the first virtual machine needs additional computing resources and at least a portion of the assigned computing resources of the at least one second virtual machine are not being used by the at least one second virtual machine.

DETAILED DESCRIPTION OF EXEMPLARY EMBODIMENTS

Figure 1:
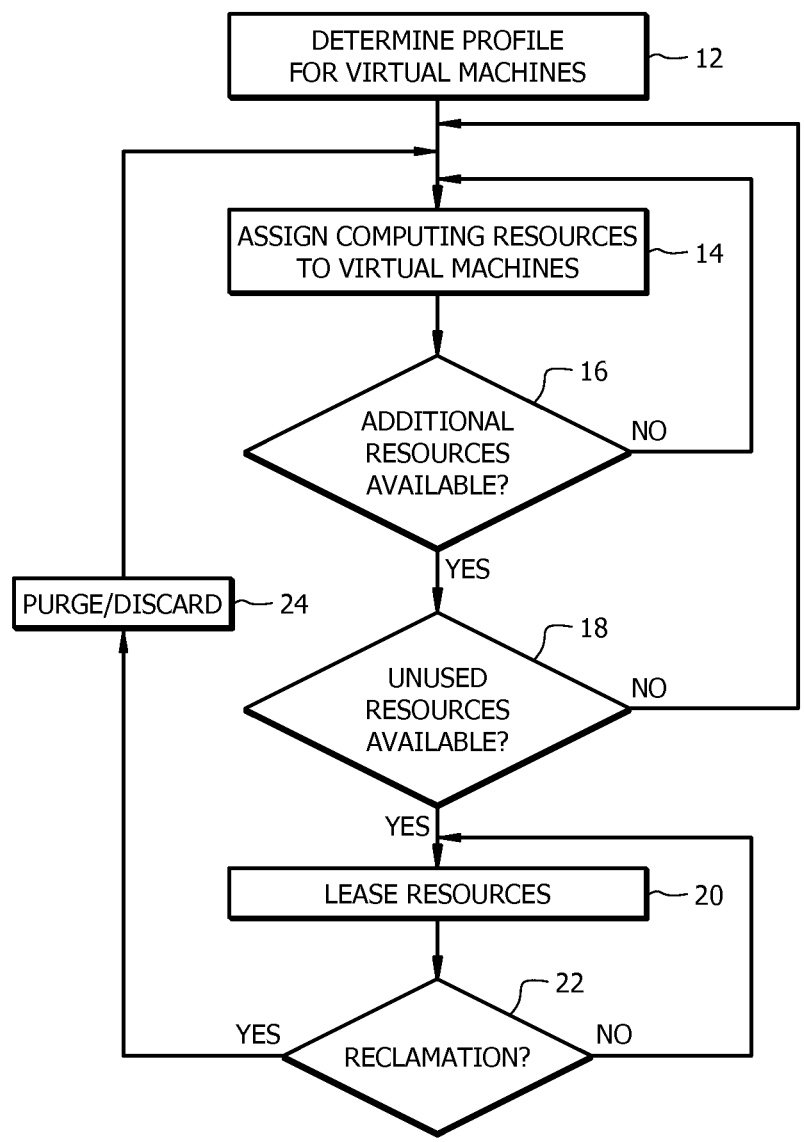
FIG. 1 is a block diagram of a method for providing virtualized quality of service (QoS) in a virtualized environment, according to embodiments of the invention.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

As used in this description, the terms "component," "module," and "system," are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more. In addition, these components may execute from various computer readable media having various data structures stored thereon. The components may communicate by way of local and/or remote processes, such as in accordance with a signal having one or more data packets, e.g., data from one component interacting with another component in a local system, distributed system, and/or across a network, such as the Internet, with other systems by way of the signal.

With regard to virtualized environments, Quality of Service (QoS) can be divided into two categories: input/output (IO) provisioning and Bandwidth provisioning. IO provisioning involves exposing a host so that operating system native drivers can process a particular IO request. Bandwidth provisioning is internal to caching software or firmware.

IO provisioning involves static parameters that are associated with a virtual drive (VD), or virtual drive controller, at the start of the day. Sometimes these parameters can be modified at runtime. However, most operating systems do not support dynamic changes of IO provisioning. IO provisioning changes can be executed at start of each VM, but IO provisioning changes cannot be executed while the operating system is up and running. This creates a resource limitation in virtualized environments. That is, no VM can use more than its specified amount of computing resources.

Caching and tiering processes can assign a portion of the overall computing resources to one or more VMs. By this assignment, all or a portion of the computing resources of the virtual controller can be divided up among multiple VMs. By default, all or a portion of the computing resources of the virtual controller can be divided equally among all of the VMs. Also, a user can divide all or a portion of these computing resources unequally to satisfy various IO hungry VMs. The VMs typically are limited by such a static IO provisioning scheme. The parameters of such a static IO provisioning scheme typically are as follows: (1) Max Number of IO commands possible per VD (Max Queue Depth per VD), and (2) Max Request Size possible per IO command (Max IO size).

In such static IO provisioning schemes, the VD gets an overall amount of computing resources, which collectively can deliver N gigabytes of data (Max Number of IO commands*Max Request Size). Such IO provisioning guarantees computing resources of N gigabytes of data per second on that particular VD.

Bandwidth provisioning is dynamic in nature. Bandwidth provisioning applies to caching (or tiering) devices in virtualized environments. Bandwidth provisioning typically allows VMs to compete against other VMs in a virtualized environment. Bandwidth provisioning dictates the manner in which commands are picked and executed from a queue to satisfy the IO needs of all of the VMs. In a virtualized environment, each VD can host multiple VMs. To avoid contention of processing commands from different VMs, an order of precedence logic typically is used to determine the order of execution of the available processing commands. The user may want to give higher priority to a particular VM, so that the particular VM can be the first VM to process commands. In this manner, the higher priority VM will process N number of commands in a batch before another (lower priority) VM is picked for execution of its processing commands.

For example, assume that a VM1 has 1024 total commands (set by an IO provisioning scheme) and a VM2 has 512 commands (also set by an IO provisioning scheme). Also, a user can set a batch size threshold for VM1 (e.g., 32 commands) and a batch size threshold for VM2 (e.g., 10 commands), as well as determine that VM1 has first priority over VM2. In this manner, a caching or tiering process involves pulling a batch of 32 commands from VM1 for processing, and then going to VM2 for processing 10 batch commands. Next, the caching or tiering process will come back to VM1 to process 32 commands. In this manner, the processing commands of VM1 will be executed faster than those of VM2.

Caching and tiering require an even different type of thin provisioning, called cache (flash space) provisioning. Cache provisioning is a type of thin provision for caching and tiering that is very dynamic in nature and can be applied differently to each VM. Cache provisioning also can be changed based on its policy. Cache provisioning can be used as part of a guarantee quota model for caching and tiering.

Referring now to FIG. 1, shown is a block diagram of a method 10 for providing virtualized quality of service (QoS) in a virtualized environment, according to embodiments of the invention. The method 10 includes a step 12 of determining profiles for the VMs in the virtualized environment. There can be predefined or default QoS profiles for both IO provisioning and Bandwidth provisioning for each of the VMs in the virtualized environment. The QoS profiles are easily selectable depending on the functionality of the VMs. For example, if the purpose of a particular VM is to run Structure Query Language (SQL) or applications, then the configuration parameter-related SQL, or other applications, will be selected to support IO provisioning and Bandwidth provisioning. The QoS profiles also can be changed by a user.

Figure 2:
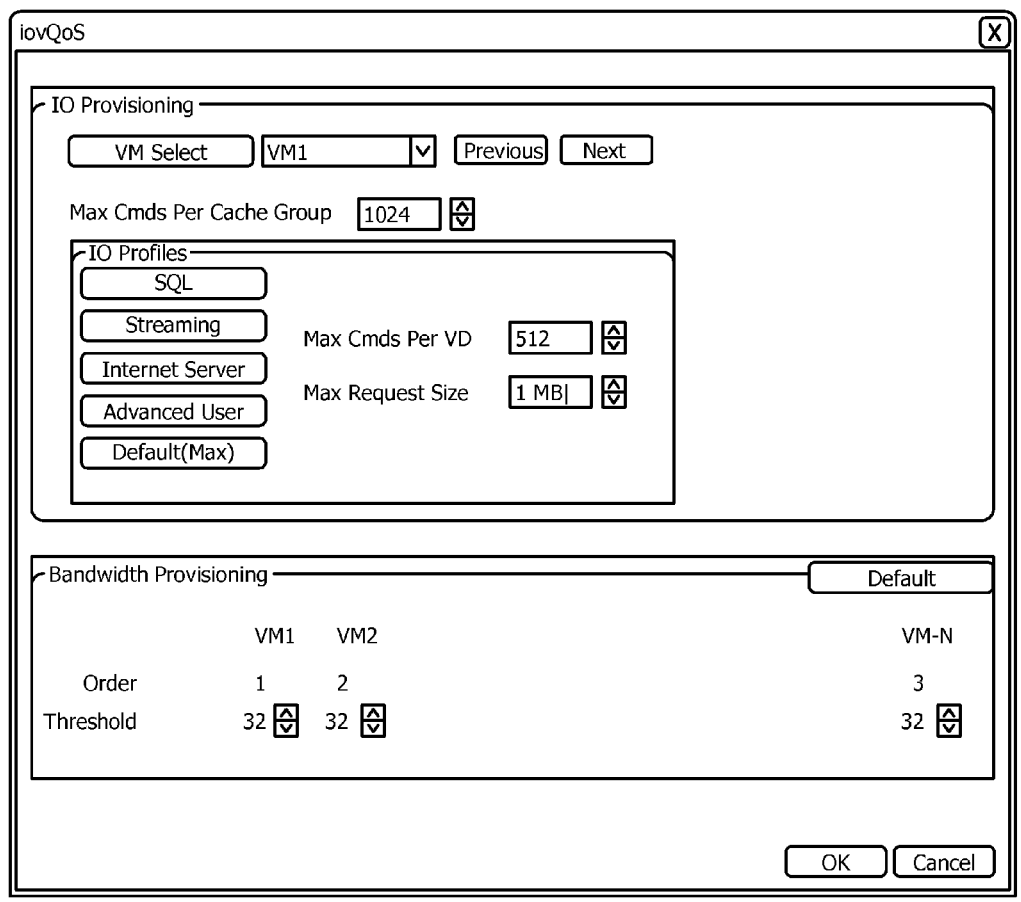
FIG. 2 is a screen shot of a profile for input/output (IO) provisioning and bandwidth provisioning of a virtual machine (VM), according to embodiments of the invention.

Referring now to FIG. 2, with continuing reference to FIG. 1, shown is a screen shot 30 of a profile for IO provisioning and bandwidth provisioning of a virtual machine (VM), according to embodiments of the invention.

The method also includes a step 14 of assigning computing resources to the VMs. The computing resources assigned to the VMs can be in the form of the amount of data or information that can be transferred to or from one or more VM (IO provisioning), the number of instructions or commands that can be performed or executed for one or more VM (bandwidth provisioning) or the amount of cache space available for use by one or more VM.

According to embodiments of the invention, computing resources are assigned to the VMs based on the QoS profile of the particular VM being assigned computing resources. Also, according to embodiments of the invention, a minimum quota or amount of computing resources are assigned to each of the VMs.

For example, a cache device can set a minimum guaranteed quota for all VMs. The minimum guaranteed quota for all VMs means that each VM will get a minimum size of cache in flash. For example, assume there are three VMs (VM A, VM B and VM C) and the minimum quota is set for 10%. In this case, each VM will get 10% of space for cache.

The method also includes a step 16 of determining whether one or more VMs needs any additional computing resources. If none of the VMs need any additional computing resources at a given time (No), no action is performed. However, if one or more VMs need additional computing resources, the method 10 performs a step 20 whereby computing resources are leased from one or more VMs to one or more other VMs.

For example, assume that each of VM A, VM B and VM C each have a minimum quota of 10% of available cache space. With respect to the remaining 70% of cache available, also assume that VM A is a demanding VM and uses an additional 40% of available cache, and VM B also is a demanding VM and uses an additional 30% of available cache. Also assume that VM C is not using any cache, although it has a minimum guaranteed quota of 10% reserved for its future use. For example, VM C may be a file server that activates only at 2:00 am for creating snapshot pits. During the daytime, VM C is practically inactive.

As indicated, assume that VM A is very demanding and often requires additional cache space. However, there is no available cache space. In this situation, according to embodiments of the invention, VM C can lease all or a portion of its 10% of available cache space to VM A. If cache space is leased to another VM, the leased cache space cannot be used for write-back cache (writing data to cache and to a physical data storage device). Such use would make the cache space dirty. Also, VM-C, owner of the cache, can ask for its leased cache space back for its own use when it required, and the leasing VM must return the leased cache space to its owner as quickly as possible, as discussed hereinbelow. To make leased cache space reclamations faster, the VM leasing the cache space (VM A, in this example) cannot make any of the leased cache space dirty, as indicated hereinabove.

The method 10 also includes a step 22 of determining whether or not the leasing VM wants to reclaim all or a portion of its computing resources leased to one or more other VMs. If the owner VM C does not want to reclaim any of its leased computing resources (No), no action is performed. However, if the leasing VM C does want to reclaim at least a portion of its leased computing resources (Yes), the method 10 begins a reclamation process, as described hereinbelow.

When the owner VM (VM C, in this example) wants to reclaim its original cache space, the VM leasing the cache space (VM A, in this example) returns the leased cache space back to the original owner VM (VM C, in this example) as soon as the leased cache space is purged or discarded, shown generally as a purging or discarding step 24. Cache purging or discarding takes a relatively small amount of time compared to a flush of the cache space. The cache flush time depends on the size of the cache space. If the VM leasing the cached space (VM A, in this example) uses the leased cache space for its read/write cache, then the VM leasing the cached space (VM A, in this example) cannot return the leased cache space to the owner VM (VM C, in this example) until the cache space is flushed. It will take some time to flush this cache space. Therefore, the leased cache space can be used by the VM leasing the cached space (VM A, in this example) for read-only or write-through cache functions.

According to embodiments of the invention, the virtualized QoS methods described hereinabove should ensure a number of rules or conditions. First, any provisioning should not exceed any physical resource limit. Also, provisioning for each VM should be based on its priority QoS profile. Also, provisioning for each VM should be based on a minimum quota. Also, leased computing resources are based on unused computing resources. Also, leased computing resources are used for read-only or write-through cache only. Also, leasing of computing resources should be performed conservatively when used computing resources hits a high water mark. Also, such in high water mark situations, the process of reclaiming leased computing resources should be started and pursued aggressively.

According to embodiments of the invention, the virtualized QoS methods described hereinabove can be used for a single route input/output virtualization (SR-IOV) controller, with and without caching and tiering. In SR-IOV applications, each virtual function (VF) is assigned or given a portion of the overall amount of computing resources. In this manner, all of the computing resources of the SR-IOV controller can be divided into multiple virtual functions. By default, the user can divide these computing resources equally among all the virtual functions. However, according to embodiments of the invention, a user can divide the computing resources among all of the virtual functions based on an IO requirement or profile of the virtual functions, as selected by the user. For relatively IO hungry VMs, the associated virtual functions typically require aggressive IO provisioning. However, all of the VMs should perform their respective IO functions in a manner that is limited by its respective IO provisioning. Parameters for IO provisioning are as follows: (1) IO per virtual controller, (2) Max Number of IO operations possible per virtual device (VD) (Queue Depth per VD), (3) Max Request Size possible per IO function (Max IO size), and (4) Max Scatter Gather List (SGL).

In this process, a virtual device is assigned or given a portion of the available computing resources that can deliver N gigabytes of data per second (MaxNumber of IO operations*MaxRequestSize). This will guarantee enough computing resources to process N gigabytes of data per second on that particular virtual device in the SR-IOV controller.

According to embodiments of the invention, bandwidth provisioning also applies to SR-IOV controllers in virtualized environments. However, bandwidth provisioning has a different meaning for SR-IOV controllers than for cache devices. In an SR-IOV firmware, commands are picked from a queue and process IO operations are performed based on the order in which they are picked from the queue. Each virtual device can host multiple virtual functions. Again, the same order of priority applies for processing commands. A user may want to give a higher priority to a particular virtual function, so that the particular virtual function will be the first virtual function to process commands. The first virtual function can process N number of commands before priority switches to another virtual function. For example, if VM1 (virtual machine 1) has 256 maximum process commands and VM2 has 128 maximum process commands, the user can set a first number of process commands (e.g., 16 process commands) for VF1, and a second number of process commands (e.g., 8 commands) for VF2. Also, in this example, VM1 has priority over VM2, so VM1 will pull 16 process commands from VF1 and then priority shifts to VF2 to process 8 process commands. Then, priority will shift back to VF1 to process its next 16 process commands. In this manner, the SR-IOV firmware will process VF1 commands faster than VF2 commands.

Figure 3:
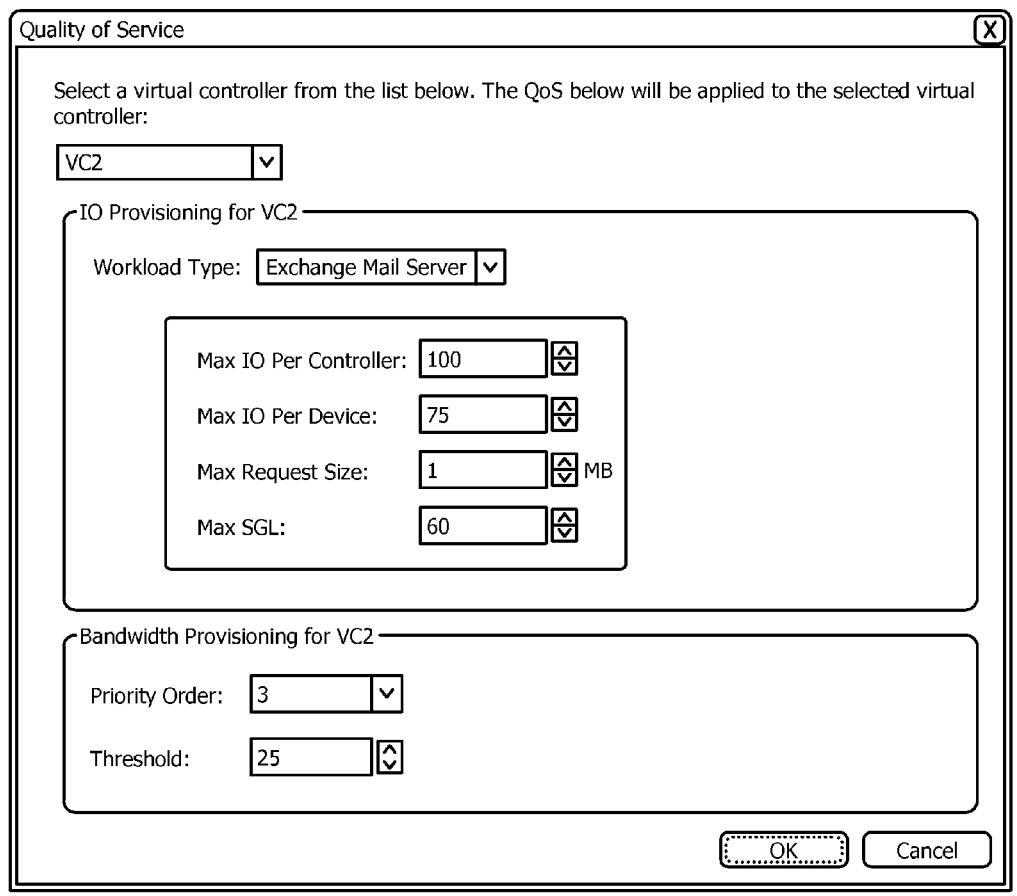
FIG. 3 is a screen shot of a default quality of service (QoS) profile for virtual controllers in a virtualized environment, according to embodiments of the invention.

Referring now to FIG. 3, shown is a screen shot of a default quality of service (QoS) profile for virtual controllers in a virtualized environment, according to embodiments of the invention. According to embodiments of the invention, there are predefined (default) QoS profiles, the parameters of which are easily selectable depending on the functionality of the particular VM. For example, if the only purpose of a VM is to run Exchange Server, then Exchange Server configuration parameters are selected for that particular VM.

In an SR-IOV environment, there are two sets of QoS profiles, one set of QoS profiles is related to global IO priorities and the threshold pertaining to the physical function (PF) in the hypervisor virtual machine manage (VMM), the other set of QoS profiles is related to the individual virtual controller IO characteristics for that particular VM.

Figure 4:
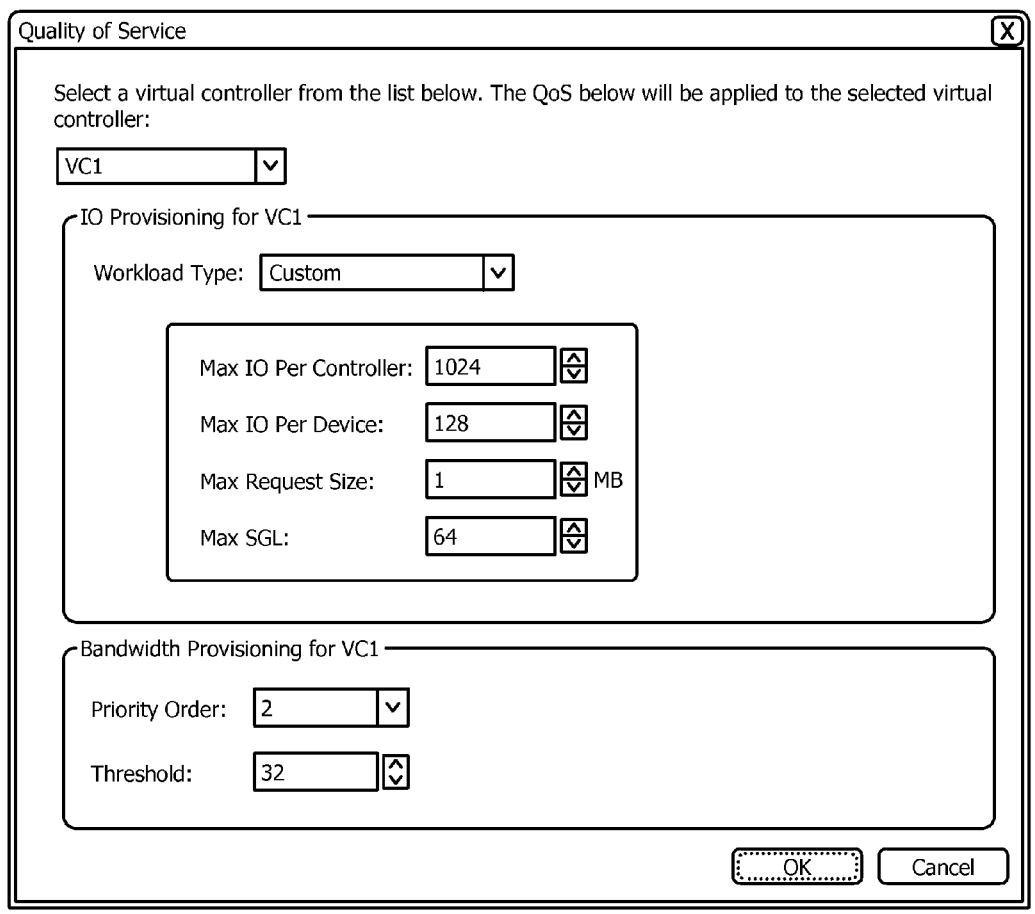
FIG. 4 is a screen shot of a manual setting quality of service (QoS) profile for virtual controllers in a virtualized environment, according to embodiments of the invention.

Another example is a custom IO profile, which can be used for a virtual controller. Referring now to FIG. 4, shown is a screen shot of a manual setting quality of service (QoS) profile for virtual controllers in a virtualized environment, according to embodiments of the invention.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter," "then," "next," and other similar words are not intended to limit the order of the steps. These words simply are used to guide the reader through the description of the exemplary method. Also, one of ordinary skill in programming will be able to write computer code or identify appropriate hardware and/or circuits to implement the disclosed invention without difficulty, based on the flow charts and associated description in this specification. Therefore, disclosure of a particular set of program code instructions or detailed hardware devices is not considered necessary for an adequate understanding of how to make and use the invention.

Figure 5:
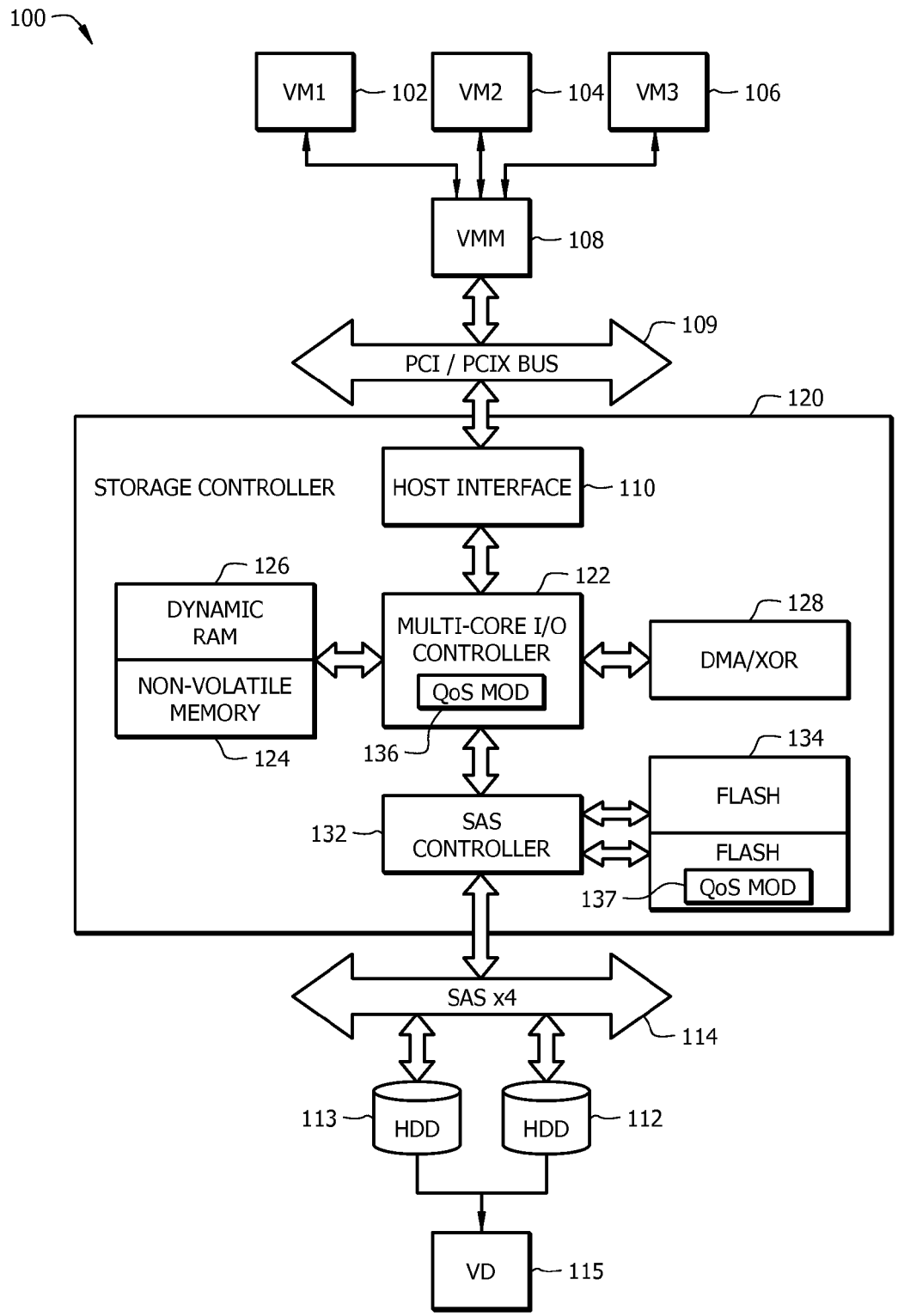
FIG. 5 is a schematic view of an apparatus or system for providing virtualized quality of service (QoS) in a virtualized environment, according to embodiments of the invention.

Referring now to FIG. 5, shown is a schematic view of an apparatus or system 100 for providing virtualized quality of service (QoS) in a virtualized environment, according to embodiments of the invention. The apparatus or system 100 includes a storage controller 120, which manages the operation of an associated data storage device, including reading data from and writing data to the data storage device. For example, the storage controller 120 processes requests from a host system attached thereto into appropriate requests to the data storage device. The host system can include a plurality of virtual machines (e.g., VM1 102, VM2 104 and VM 3 106) coupled to a virtual machine manager (VMM) 108. The host system is coupled to the storage controller 120 via an appropriate bus 109, such as a PCI/PCIX bus, and is coupled to a host interface 110 within the storage controller 120. The host interface can be or include a single route input/output virtualization (SR-IOV) host interface. The data storage device can be a storage array, such as a Redundant Array of Inexpensive Disks (RAID) storage array that includes a plurality of hard disk drives (HDDs) 112, 113 coupled to the storage controller 120 via an appropriate bus 114, such as a Serial Attached SCSI (SAS)/SCSI interface bus. The plurality of hard disk drives (HDDs) 112, 113 also can include one or more virtual devices 115 coupled thereto.

The storage controller 120 includes a multi-core input/output (I/O) processor or controller 122, a non-volatile memory element 124, a dynamic random access memory (RAM) element 126 typically having various data (including firmware code) at least temporarily stored therein, and a suitable direct memory access (DMA) hardware component 128, such as the XOR DMA hardware. The storage controller 120 also includes a SAS/SCSI controller or interface 132, which interfaces with the data storage device, allows data communication between the storage controller 120 and the data storage device. Also, firmware code stored in one or more flash drive storage devices 134 attached to the SAS/SCSI controller 132 is loaded into the dynamic RAM element 126 for execution by one or more of the virtual machines 102-106.

The storage controller 120 also includes a quality of service (QoS) module or other suitable component or components for providing virtualized quality of service (QoS) in a virtualized environment, according to embodiments of the invention. For example, the QoS module can be contained within or included as part of the multi-core input/output (I/O) controller 122 and/or within or as part of one or more of the flash drive storage devices 134. Alternatively, the QoS module can be located in some other suitable portion or component of the storage controller 120.

The storage controller 120 can include any suitable conventional elements, such as microprocessors, memory and hard-wired logic, that in accordance with suitable programming or configuration logic allow the storage controller 120 to effect the functions or methods described herein, as well as any other suitable functions that persons skilled in the art understand are characteristic of conventional storage controllers. Such programming logic can be stored in the form of software or firmware that has been loaded into memory for execution by one or more processors, either on an as-needed or random-access basis or as firmware stored in non-volatile memory (e.g., programmable read-only memory).

One or more of the components within the storage controller 120, including the multi-core input/output (I/O) processor or controller 122, the non-volatile memory element 124, the dynamic RAM element 126, the direct memory access (DMA) hardware component 128, the host interface 110 and the SAS/SCSI controller 132, can be comprised partially or completely of any suitable structure or arrangement, e.g., one or more integrated circuits. Also, it should be understood that the storage controller 120 includes other components, hardware and software (not shown) that are used for the operation of other features and functions of the storage controller 120 not specifically described herein.

The storage controller 120 can be partially or completely configured in the form of hardware circuitry and/or other hardware components within a larger device or group of components. Alternatively, the storage controller 120 can be partially or completely configured in the form of software, e.g., as processing instructions and/or one or more sets of logic or computer code. In such configuration, the logic or processing instructions typically are stored in a data storage device (not shown). The data storage device typically is coupled to a processor, such as the multi-core input/output (I/O) processor or controller 122. The processor accesses the necessary instructions from the data storage device and executes the instructions or transfers the instructions to an appropriate location within the storage controller 120.

As discussed hereinabove, the storage controller 120 typically is programmed with read-only memory (ROM) images that contain various firmware, e.g., one or more firmware images, such as a RAID firmware image. These firmware images include various sub-modules that are executed by various hardware portions of the storage controller during the operation of the storage controller 120. Alternatively, one or more of the firmware images, such as the RAID firmware image, can be stored on a flash device (e.g., the iSATA flash drive), and loaded into RAM for execution.

In one or more aspects, the functions described may be implemented in hardware, software, firmware, or any combination thereof. If implemented in software, the functions may be stored on or transmitted as one or more instructions or code on a non-transitory computer-readable medium. Non-transitory computer-readable media includes computer storage media, including any tangible medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other tangible medium that may be used to carry or store desired program code in the form of instructions or data structures and that may be accessed by a computer.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for sharing computing resources in a virtualized environment having a plurality of virtual machines, comprising:
   assigning a portion of the computing resources to the plurality of virtual machines; and
   leasing by a first virtual machine at least a portion of the assigned computing resources of at least one second virtual machine,
   wherein the first virtual machine leases computing resources from the at least one second virtual machine when the first virtual machine needs additional computing resources and at least a portion of the assigned computing resources of the at least one second virtual machine are not being used by the at least one second virtual machine,
   wherein the computing resources include cache space available for use by at least one of the virtual machines, and wherein the first virtual machine leasing the cache space cannot make the leased cache space dirty cache space.

2. The method as recited in claim 1, wherein portions of the computing resources are assigned to the plurality of virtual machines based on a computing resource profile of each of the plurality of virtual machines, wherein the computing resource profile of each virtual machine is based on the functionality and computing priority of the virtual machine relative to the other virtual machines.

3. The method as recited in claim 1, wherein each of the plurality of virtual machines has assigned thereto a guaranteed minimum portion of the assigned computing resources.

4. The method as recited in claim 1, further comprising the at least one second virtual machine reclaiming from the first virtual machine the computing resources leased to the first virtual machine.

5. The method as recited in claim 4, wherein the first virtual machine returns the leased computing resources to the at least one second virtual machine as soon as the first virtual machine has purged the leased cache space.

6. The method as recited in claim 1, wherein the computing resources include at least one of the amount of information that can be transferred to or from at least one of the virtual machines, the number of computing instructions executed for at least one of the virtual machines, and the amount of cache space available for use by at least one of the virtual machines.

7. A storage controller device, comprising:
an interface configured to couple the storage controller device to at least one data storage device; and
a processor coupled to the interface and configured to read data from and write data to the at least one data storage device,
wherein the storage controller device includes a controller that hosts a virtualized environment having a plurality of virtual machines,
wherein the storage controller device is configured to
assign a portion of the computing resources to the plurality of virtual machines, and
lease by a first virtual machine at least a portion of the assigned computing resources of at least one second virtual machine,
wherein the first virtual machine leases computing resources from the at least one second virtual machine when the first virtual machine needs additional computing resources and at least a portion of the assigned computing resources of the at least one second virtual machine are not being used by the at least one second virtual machine,
wherein the computing resources include cache space available for use by at least one of the virtual machines, and wherein the first virtual machine leasing the cache space cannot make the leased cache space dirty cache space.

8. The device as recited in claim 7, wherein the storage controller device assigns portions of the computing resources to the plurality of virtual machines based on a computing resource profile of each of the plurality of virtual machines, wherein the computing resource profile of each virtual machine is based on the functionality and computing priority of the virtual machine relative to the other virtual machines.

9. The device as recited in claim 7, wherein the storage controller device assigns each of the plurality of virtual machines a guaranteed minimum portion of the assigned computing resources.

10. The device as recited in claim 7, wherein the storage controller device is configured to return to the at least one second virtual machine the leased computing resources leased by the first virtual machine from the at least one second virtual machine.

11. The device as recited in claim 10, wherein the storage controller device is configured to return to the at least one second virtual machine the leased computing resources leased by the first virtual machine from the at least one second virtual machine as soon as the first virtual machine has purged the leased cache space.

12. The device as recited in claim 7, wherein the computing resources include at least one of the amount of information that can be transferred to or from at least one of the virtual machines, the number of computing instructions executed for at least one of the virtual machines, and the amount of cache space available for use by at least one of the virtual machines.

13. A non-transitory computer readable medium storing instructions that carry out a method for sharing computing resources in a virtualized environment having a plurality of virtual machines, the method comprising:
instructions for assigning a portion of the computing resources to the plurality of virtual machines; and
instructions for leasing by a first virtual machine at least a portion of the assigned computing resources of at least one second virtual machine,
wherein the first virtual machine leases computing resources from the at least one second virtual machine when the first virtual machine needs additional computing resources and at least a portion of the assigned computing resources of the at least one second virtual machine are not being used by the at least one second virtual machine,
wherein the computing resources include cache space available for use by at least one of the virtual machines, and wherein the first virtual machine leasing the cache space cannot make the leased cache space dirty cache space.

14. The non-transitory computer readable medium as recited in claim 13, wherein portions of the computing resources are assigned to the plurality of virtual machines based on a computing resource profile of each of the plurality of virtual machines, wherein the computing resource profile of each virtual machine is based on the functionality and computing priority of the virtual machine relative to the other virtual machines.

15. The non-transitory computer readable medium as recited in claim 13, wherein the instructions for assigning a portion of the computing resources to the plurality of virtual machines includes instructions for assigning to each of the plurality of virtual machines has assigned thereto a guaranteed minimum portion of the assigned computing resources.

16. The non-transitory computer readable medium as recited in claim 13, instructions for reclaiming by the at least one second virtual machine from the first virtual machine the computing resources leased to the first virtual machine.

17. The non-transitory computer readable medium as recited in claim 16, wherein the first virtual machine returns the leased computing resources to the at least one second virtual machine as soon as the first virtual machine has purged the leased cache space.

* * * * *